United States Patent [19]
Kuck

[11] 3,783,700
[45] Jan. 8, 1974

[54] WINDSHIELD WASHER PUMP ASSEMBLY
[75] Inventor: Lloyd L. Kuck, Dayton, Ohio
[73] Assignee: General Motors Corporation, Detroit, Mich.
[22] Filed: Nov. 29, 1972
[21] Appl. No.: 310,578

[52] U.S. Cl. .................. 74/55, 15/250.02
[51] Int. Cl. ........................ F16h 25/08
[58] Field of Search .......... 74/55; 15/250.02; 239/284; 92/140

[56] References Cited
UNITED STATES PATENTS

| | | | |
|---|---|---|---|
| 3,078,493 | 2/1963 | Ryck et al. | 15/250.02 |
| 3,115,095 | 12/1963 | Ziegler | 92/140 |
| 3,503,090 | 3/1970 | Romanowski | 15/250.02 |
| 3,503,091 | 3/1970 | Petry et al. | 15/250.02 |
| 3,574,337 | 4/1971 | Edwards | 239/284 |
| 3,574,882 | 4/1971 | Petry | 15/250.02 |

Primary Examiner—Charles J. Myhre
Assistant Examiner—Wesley S. Ratliff, Jr.
Attorney—W. S. Pettigrew et al.

[57] ABSTRACT

In a preferred form, this disclosure relates to a washer pump assembly for a windshield cleaning apparatus for an automotive vehicle. The washer pump assembly includes a reciprocable pump having a spring actuated delivery stroke and an interruptible driving connection with a drive means. The washer pump assembly further includes a control and timer mechanism which is selectively operable, when energized, to provide either a demand wash cycle during which the pump operates as long as the operator desires or a programmed wash cycle during which the pump is drivingly connected with the drive means for a predetermined time interval and then automatically disconnected therefrom.

3 Claims, 7 Drawing Figures

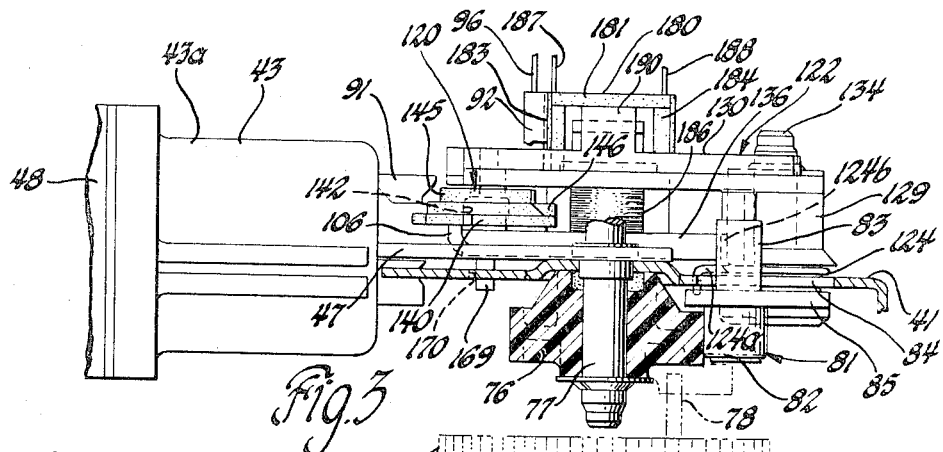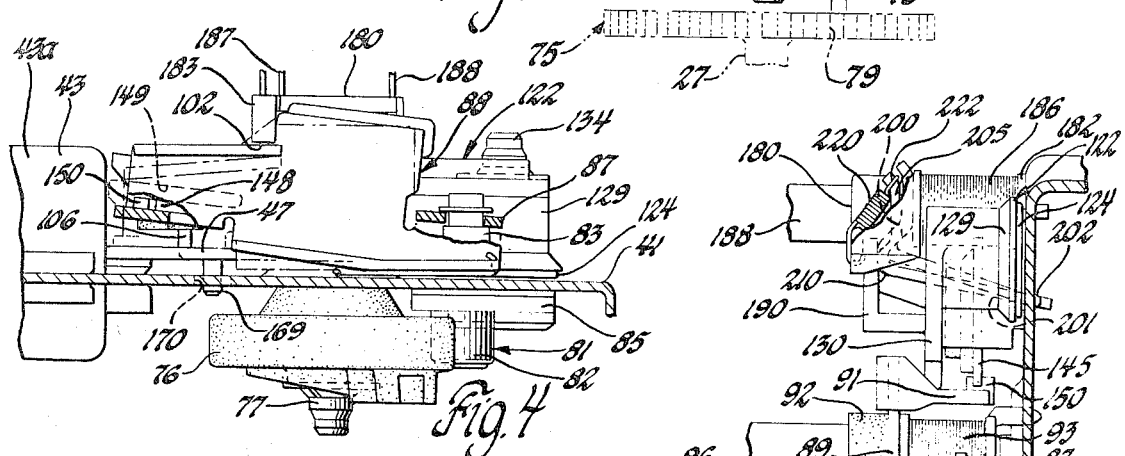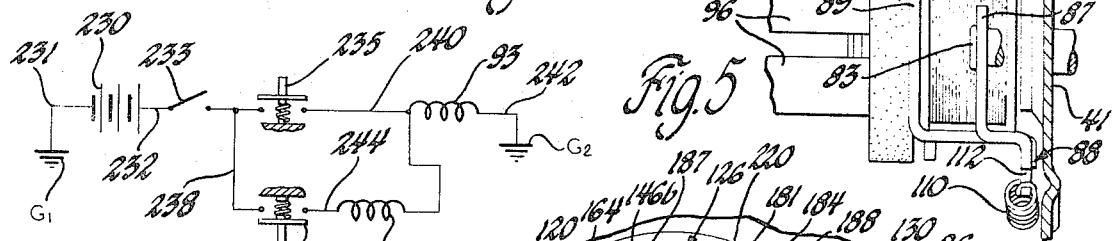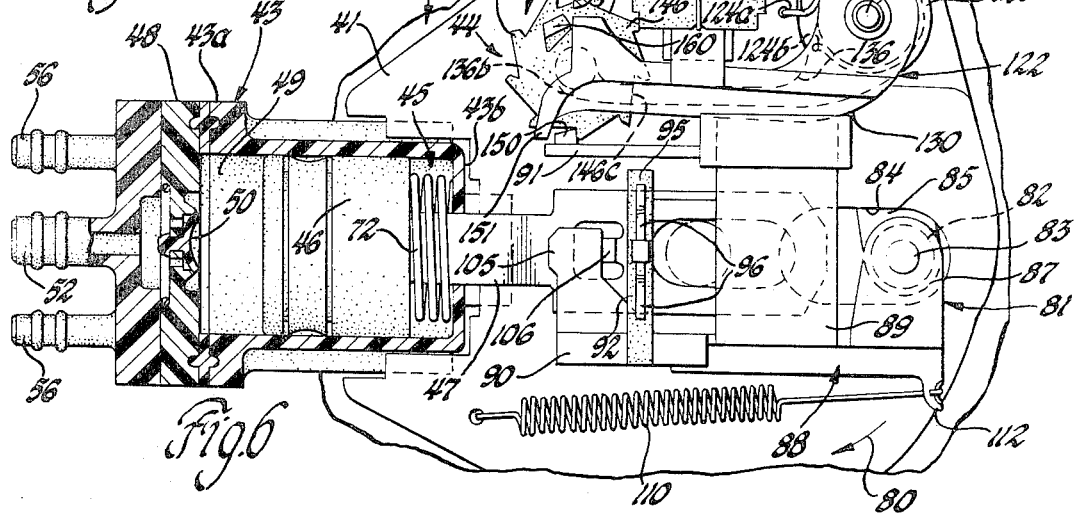

WINDSHIELD WASHER PUMP ASSEMBLY

The present invention relates to a windshield or window cleaning apparatus, and more particularly to a programmed washer pump assembly for delivering washer fluid for a predetermined time interval to different glass surface areas, such as different windshield areas of a vehicle.

Heretofore, programmed washer pump assemblies for intermittently squirting washer fluid onto a windshield of an automotive vehicle for a predetermined time interval or number of wiper strokes have included a reciprocable, plunger or piston type pump having a spring actuated delivery stroke and an interruptible driving connection with the drive means or motor for the wiper unit. These known assemblies have included ratchet timer mechanisms which, when energized, effected a driving connection between the drive means and the plunger means of the pump for a predetermined time interval and then automatically interrupted the driving connection therebetween. Examples of such washer pump assemblies are shown in U.S. Pat. Nos. 3,078,493; 3,503,090; and 3,574,882, and assigned to the same assignee as the present invention.

It is also known to provide a demand washer pump assembly having an interruptible driving connection between the drive means of the wiper motor and the plunger of the pump. As shown in U.S. Pat. No. 3,115,095, and assigned to the same assignee as the present invention, the washer pump assembly included a pawl which was constantly reciprocated by the drive means of the wiper motor and which was spring biased toward a first position in which it did not engage a pump rod on the pump plunger, but which was movable toward a second position in which it did engage the pump rod of the plunger means to effect pumping operation when a solenoid was energized. The length of the demand cycle depended upon the length of time the solenoid was maintained energized.

Additionally, it is known to provide a programmed washer pump assembly having a ratchet timer means which could be selectively controlled to provide two programmed cycles of different lengths of duration. Such an assembly is shown in U.S. Pat. No. 3,454,977, and assigned to the same assignee as the present invention. It is further known to provide a pneumatically actuated windshield washer pump assembly which can be selectively controlled by a fluid amplifier to provide either a demand wash cycle during which washer fluid is delivered so long as the operator desires or a programmed wash cycle during which the washer pump assembly delivers washer fluid for a predetermined time interval and then stops. Such a washer system is shown in U.S. Pat. No. 3,601,319, and assigned to the same assignee as the present invention.

The present invention provides a novel electromechanical washer pump assembly for intermittently squirting washer fluid onto a windshield of an automotive vehicle, and in which the washer pump assembly can be selectively controlled to provide either a demand wash cycle of operation for as long a period as the operator desires or a programmed wash cycle of operation during which a washer pump delivers intermittent squirts of washer fluid for a predetermined time interval and then automatically stops.

Accordingly, an important object of the present invention is to provide a new and improved electromechanical washer pump assembly for intermittently squirting washer fluid against different glass surface portions of an automotive vehicle, such as different portions of the windshield, and which can be selectively operated to provide either a demand wash cycle during which washer fluid is intermittently squirted so long as the operator desires or a programmed wash cycle during which washer fluid is intermittently squirted for a predetermined time interval and then automatically stopped.

Another object of the present invention is to provide a new and improved washer pump assembly for intermittently delivering squirts of washer fluid for a predetermined time interval to the windshield of an automotive vehicle and which includes a support means, a washer pump supported by the support means and having a plunger means which is reciprocable through intake and discharge strokes, a spring means for effecting movement of the plunger means through its discharge stroke, a drive means having an interruptible driving connection with the plunger means and when drivingly connected therewith, alternately effecting movement of the plunger means through its intake stroke in opposition to the biasing force of the spring means and allowing the spring means to move the plunger through its discharge stroke, the drive means including a drive pawl which is constantly reciprocated through first and second strokes when the drive means is energized and which is movable between a first position in which it is not drivingly connected with the plunger means and a second position in which it is drivingly connected with the plunger means, and a control mechanism which is selectively operable to provide either a demand wash cycle during which the pawl is drivingly connected with the plunger means so long as the operator desires or a programmed wash cycle during which the pawl is drivingly connected with the plunger means for a predetermined time interval and then automatically disconnected therefrom, and in which the control mechanism includes a first selectively energizable means for moving the pawl from its first position towards its second position to effect a driving connection between the pawl and the plunger means so long as the first means is energized, and a second control means including a ratchet timer which is shiftable between a first position and which is not indexed by the pawl when the latter is in its second position, and a second position in which it holds the pawl in its second position and is indexed by the pawl, and a manually manipulatable control means which can be selectively operated to effect energization of the first means to drivingly connect the pawl with the plunger means and to effect retention of the second control means in its first position when a demand wash cycle of operation is desired and to effect momentary energization of the first means to drivingly connect the pawl with the plunger means and to allow the second means to move the ratchet timer to its second position to control the programmed wash cycle of operation.

Yet another object of the present invention is to provide a new and improved washer pump assembly, as defined in the next preceding object, and wherein during the programmed wash cycle the ratchet timer functions to hold the pawl in its second position as it is being reciprocated until the ratchet timer has been indexed one complete revolution whereupon the ratchet timer is automatically shifted towards its first position in which it releases the pawl for movement from its second position towards its first position to disconnect the driving connection between the pawl and the plunger means.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which:

FIG. 3 is a fragmentary sectional view, with parts shown in elevation, and taken approximately along line 3—3 of FIG. 2;

FIG. 4 is a fragmentary sectional view like that shown in FIG. 3, but showing different parts thereof in different positions;

FIG. 5 is the fragmentary sectional view, with parts shown in elevation, and taken approximately along line 5—5 of FIG. 2;

FIG. 6 is a plan view similar to that shown in FIG. 2, but showing different parts thereof in different positions; and FIG. 7 is a schematic wiring diagram for controlling operation of the washer pump assembly of the present invention.

Figure 1:
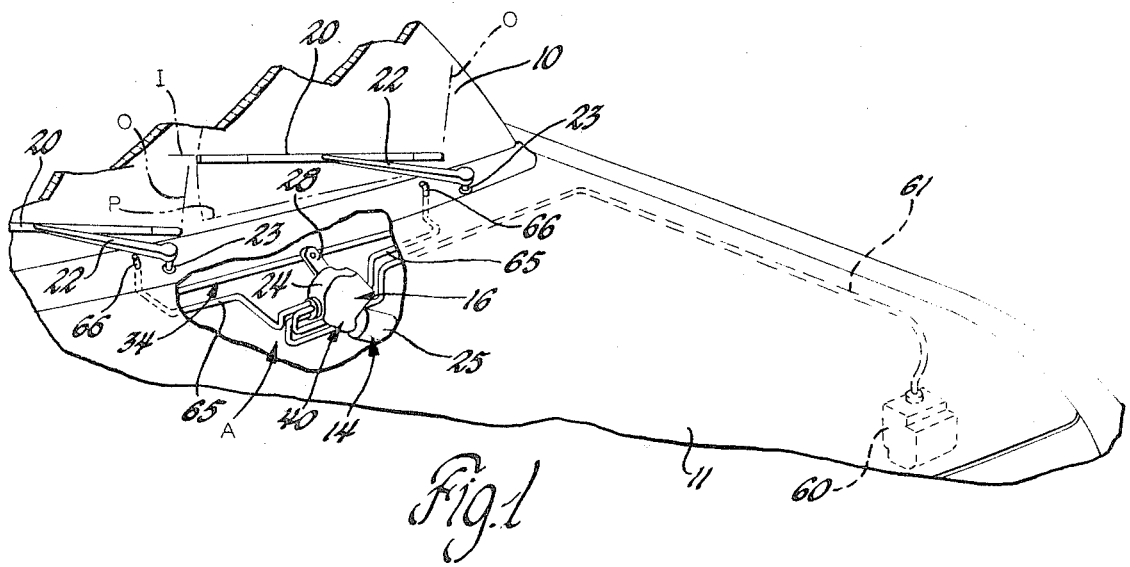
FIG. 1 is a fragmentary perspective view of an automotive vehicle embodying the novel windshield washer pump assembly of the present invention.

As representing a preferred embodiment of the present invention, FIG. 1 of the drawings shows a windshield cleaning apparatus A for cleaning a windshield 10 of an automotive vehicle 11. The windshield cleaning apparatus A broadly comprises a wiper unit 14 for wiping the windshield 10 and a washer unit 16 for delivering intermittent squirts of washer fluid onto the windshield and which is adapted to be operated conjointly in timed relationship with the wiper unit 14.

The wiper unit 14 comprises a pair of wiper blades 20 which are adapted to be moved to and fro in arcuate paths across the windshield 10 between inboard and outboard positions I and O, respectively, and to a depressed parked position P when wiper operation is being terminated. The wipers 20 are carried by oscillatable wiper arms 22 drivingly connected to oscillatable drive pivots 23 suitably carried by the vehicle at spaced locations adjacent the lower edge of the windshield 10.

The drive pivots 23 are adapted to be oscillated by a drive mechanism which includes an electric wiper motor 25 connected via a conventional gear reduction unit 24 to a uni-directional output shaft 27 having a crank arm 28 affixed thereto. The drive mechanism could be of any suitable or conventional construction, but is preferably of the type shown in U.S. Pat. No. 3,503,090. The crank arm 28 is drivingly connected with the oscillatable drive pivots 23 via a suitable or conventional linkage arrangement 34 and, when rotated, functions through the linkage arrangement 34 to simultaneously oscillate the drive pivots 23 which in turn causes the wiper arms 22 and blades 20 to be oscillated in tandem to and fro across the windshield through the arcuate paths.

The washer unit 16, when actuated, is adapted to be operated conjointly with the wiper unit 14 and comprises a washer pump assembly 40 for intermittently providing squirts of washer fluid to be applied to the windshield 10. The washer pump assembly 40 is selectively operable to provide either a demand wash cycle during which washer operation continues so long as the operator desires or a programmed wash cycle during which intermittent squirts of washer fluid are applied to the windshield for a predetermined time interval and then automatically stopped.

Figure 2:
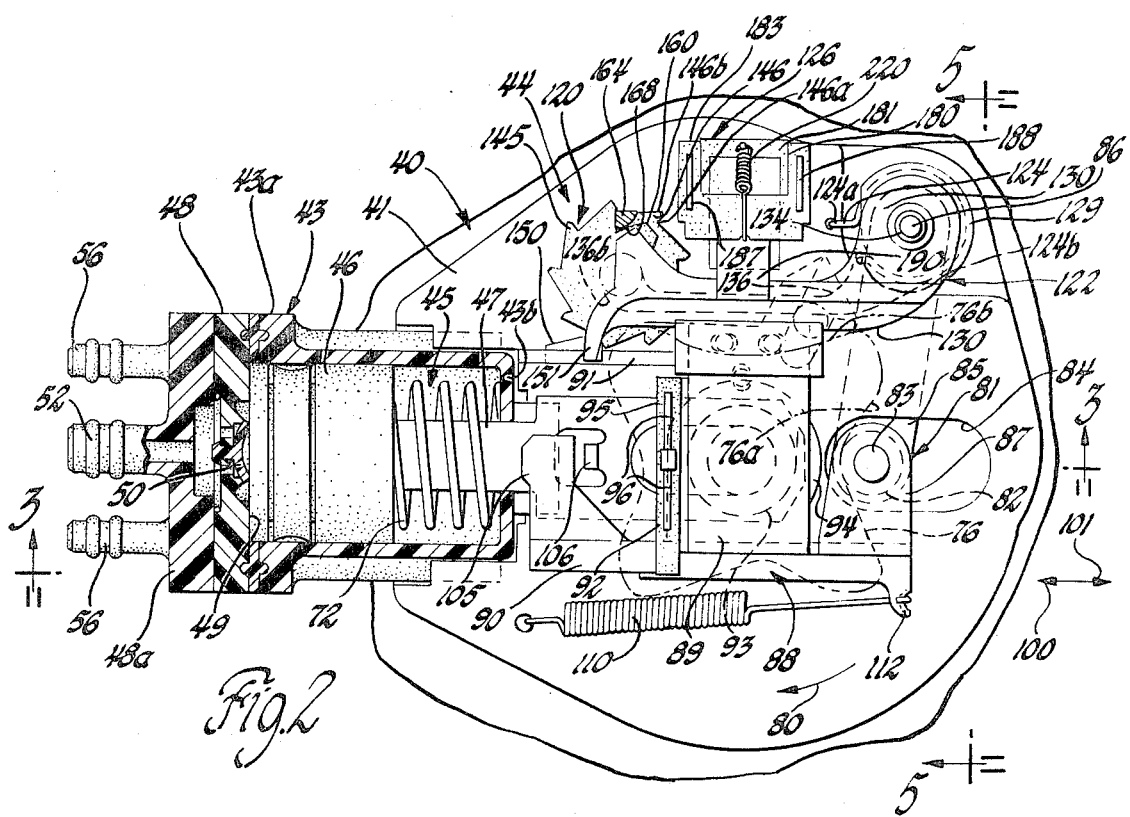
FIG. 2 is an enlarged plan view with parts shown in section of the windshield washer pump assembly of the present invention.

As best shown in FIG. 2, the washer pump assembly 40 comprises, in general, a support means or frame 41 which is suitably secured to the housing of the gear reduction unit 24, a washer pump 43 carried by the frame and which has an interruptible driving connection with the wiper motor 25, and a control mechanism 44 which is selectively operable to provide either a demand wash cycle or a programmed wash cycle of operation.

The washer pump 43 comprises a plastic pump housing 43a secured to the support frame 41 and a reciprocably movable plunger or pumping member 45 slidably received within the housing 43a. The plunger 45 includes a piston assembly 46 and a flat pump rod 47 having one end connected to the piston assembly 46 and the other end projecting rearwardly, i.e., toward the right, as viewed in FIGS. 2 and 3, beyond the adjacent rearward end 43b of the housing 43a. The pump 43 also includes a valve chamber part or body 48 at its forward end remote from the rod 47 and which defines with the piston 46 a chamber 49. The valve chamber part 48 contains an inlet check valve 50 for controlling communication between an inlet nipple 52 or a nozzle body 48a and the chamber 49 and a pair of outlet check valves (not shown) for controlling communication between the chamber 49 and a pair of outlet nipples 56 on the nozzle body 48a. The nozzle body 48a and the valve body 48 are secured to the housing 43a by screws (not shown).

The plunger 45 is adapted to be reciprocably moved through intake and discharge strokes. When the plunger is moved through its intake stroke, toward the right as viewed in FIGS. 2 and 3 of the drawings, washer fluid is drawn from a reservoir 60 via a conduit 61, inlet nipple 52 and past the check valve 50 into the chamber 49. When the plunger is moved through its discharge stroke, toward the left, as viewed in FIGS. 2 and 3, the fluid in the chamber 49 is forced under pressure past the outlet check valves (not shown) and delivered via the outlet nipples 56 and conduits 65 to a pair of nozzles 66 mounted on the vehicle adjacent the lower edge of the windshield 10. The fluid delivered to the nozzles 66 is emitted in jet form and directed toward designated areas on the windshield located in the paths of movement traversed by the wiper blades 20.

The plunger 45 is moved through its discharge stroke by a compression spring 72 encircling the pump rod 47 and having one end in abutting engagement with the end wall 43b of the housing 43a and the other end in engagement with the piston assembly 46 at its side opposite the chamber 49. The compression spring 72 biases the plunger 45 toward engagement with the valve chamber part 48.

The plunger 45 is adapted to be moved through its intake stroke in opposition to the biasing force of the compression spring 72 by a drive means 75 when the washer unit 16 is placed in operation. The drive means 75 comprises a multi-lobe cam 76 (see FIG. 3) rotatably supported on a shaft 77 secured to the support frame 41. As best shown in FIG. 2, each lobe of the cam has a rise portion 76a and a fall portion 76b. The cam 76 is drivingly connected with a gear 79 of the gear reduction unit 24 via a drive pin 78 secured to the gear 79 and received within a slot (not shown) in the underside of the cam 76. The cam 76 is rotated in the direction indicated by the arrow 80 in FIG. 2 when rotated by the gear reduction unit 24 in response to energization of the wiper unit motor 25.

The drive means 75 further includes a cam follower means 81 for moving the plunger 45 through its intake stroke. The cam follower means 81 is biased into engagement with the periphery of the cam 76 and includes a cam follower member or roller 82 which rides in peripheral engagement with the cam 76 and which is rotatably supported on the lower end of a drive member or pin 83, as viewed in FIG. 3. The drive pin 83 projects upwardly through an elongated slot 84 in the frame 41 and is connected intermediate its ends to one end of a support lever 85. The other end of the support lever 85 is pivotally connected to the support frame via a pivot pin means 86. The drive pin 83 at its upper end is swivelly connected to an ear 87 of a drive pawl 88.

The pawl 88 has a generally rectangular, inverted channel shape and has an upper bridge portion 89 and a pair of spaced side portions or legs 90 and 91. The legs 90 and 91 extend forwardly of the bridge portion 89 and an ear 87 is integral with and extends transversely of the leg 90 at a location rearwardly of the bridge portion 89. The pawl 88 straddles a plastic frame 92 for supporting a solenoid coil 93. The frame 92 includes a base portion 94 which is secured to the frame 41 and which supports the solenoid coil 93 and an upwardly extending portion 95 disposed between the legs 90 and 91 and which supports electric terminals 96 for the solenoid coil 93. The bridge portion 89 overlies the solenoid coil 93.

The pawl 88 is adapted to be reciprocated in the direction of the arrows 100 and 101 by the drive pin 83. The pawl 88 is also movable toward and from the frame 41 between first or upper and second or lower positions. When in its first position, as shown by the solid line in FIG. 4, the pawl 88 is disposed at an acute angle with respect to the frame 41 and its legs 90 and 91 engage the underside of a shoulder 102 on the upwardly extending portion 95 of the plastic frame 92 for the solenoid coil 93. The leg 90 also engages the side of the portion 95 of the frame 92. When in this position, an ear 105 extending transversely of the leg 90 toward the leg 91 is disposed above an upturned tab 106 on the pump rod 47. Thus, when the pawl 88 is in its first position, as shown by the solid lines in FIG. 4, and is reciprocated by the drive pin 83, the ear 105 will not engage the rod 47 and hence will not effect reciprocable movement of the plunger 45.

When the pawl 88 is in its second position, as shown by the phantom lines in FIG. 4, it is disposed generally parallel to the plane of the frame 41 and its ear 105 will engage the tab 106 on the pump rod 47 to effect movement of the plunger 45 through its intake stroke.

The pawl 88 is biased toward its first position and the cam follower 82 is biased into engagement with the periphery of the cam 76 by a tension spring 110. The tension spring 110 is located adjacent the leg 90 and has one end secured to the support frame 41 and its other end secured to an ear 112 integral with the pawl 88. As best shown in FIGS. 4 and 5, the ear 112 of the pawl 88 is located in a horizontal plane slightly above the point of connection of the tension spring 110 to the frame 41 so that the spring 110 causes the pawl 88 to be biased upwardly into engagement with the shoulder 102 on the plastic frame 92 and also be biased clockwise about its swivel connection with the drive pin 83 until the leg 90 engages the side of the portion 95 of the plastic frame 92.

The pawl 88 is adapted to be moved from its first position, as shown by the solid lines in FIG. 4, towards its second position, as shown by the phantom lines in FIG. 4, by the solenoid coil 93 when the latter is energized. Energization of the coil 93 causes the bridge member 89, which functions as an armature, to be moved toward the coil 93 and in opposition to the biasing force of spring 110 and hence, the pawl 88 to be moved toward its second position. Thus, the solenoid 93 forms a control means for effecting a driving connection between the drive means 75 and the pump plunger 45.

From the foregoing, it should be apparent that when the washer unit 16 is activated by energizing solenoid 93 to move pawl 88 from its first position towards its second position, as shown in FIG. 4, that a driving connection between an ear 105 on the pawl 88 and the pump rod 47 is effected. As shown in FIG. 2, a pump plunger 45 is normally positioned at the end of its discharge stroke by the spring 72. When the cam follower member 82 is engaged with the rise portion 76a of one of the lobes of the cam 76, the drive pin 83 and the pawl 88 will be moved toward the right, as viewed in FIG. 2. Movement of the pawl 88 toward the right will cause the pump rod 47 and the pump plunger 45 to move toward the right through its intake stroke in opposition to the biasing force of the spring 72. At the end of the intake stroke of the plunger 45, the cam follower 82 will be located at the high point of one of the lobes of the cam 76. Further rotation of the cam 76 in the direction of the arrow 80 causes the compression spring 72 to move the plunger 45 through its discharge stroke to deliver a squirt of washer fluid against the windshield and the springs 72 and 110 cause the pawl 88 to be moved toward the left and the cam follower 82 to roll in engagement with the fall portion 76b of the lobe of the cam 76 it is engaged with until it reaches the low point thereof. Continued rotation of the cam 76 causes the rise portion 76a of the next adjacent lobe thereof to engage the cam follower 82 to move the same toward the right to initiate the next pumping cycle.

In accordance with the provisions of the present invention, the washer pump assembly 40 can be selectively operated to provide either a demand wash cycle during which the pawl 88 is drivingly connected with the plunger means 45 so long as the operator desires or a programmed wash cycle during which the pawl 88 will be drivingly connected with the plunger means 45 for a predetermined time interval, i.e., a predetermined number of wiper strokes, and then automatically disconnected. To this end, the novel control mechanism 44 is provided.

The control mechanism 44 comprises a ratchet timer means 120 which is rotatably supported by a swingable lever means 122, which in turn is pivotally supported by the support frame 41 for movement between a first position, as shown in FIG. 6, and in which the ratchet timer means 120 is not disposed within the path of movement of the leg 91 of the pawl 88 and a second position, as shown in FIG. 2, in which the lever means 122 holds the pawl 88 in its second or lower position, when the latter has been moved thereto, and in which the ratchet timer means 120 is disposed within the path of movement of the leg 91 of the pawl 88; a spring means 124 for biasing the lever means 122 and ratchet timer 120 towards its second position, as shown in FIG. 2; and a solenoid operated retainer means 126 for normally holding the lever means 122 and ratchet timer 120 in their first position, as shown in FIG. 6, but which allows the lever means 122 and ratchet timer 120 to be moved towards their second position, as shown in FIG. 2, when energized.

The lever means 122 is bifurcated and comprises a hub 129 which is pivotally connected to a stationary support shaft 134 of the pivot pin means 86 secured to the support frame 41, a first or upper lever 130 and a spaced, but vertically aligned second or lower lever 136. As best shown in FIG. 2, the lever 136 is of a narrower width than the rigid lever 130 so that it can be flexed relative to the lever 136 and about the axis of shaft 134. The lever means 122 is made from a suitable plastic material which is substantially rigid, but flexible when of a thin cross-section like the lever 136. The lever 136 is self-biased toward the position shown in FIG. 2. Alternately, the lever means 122 could comprise separate levers, one made from a rigid plastic material and the other from a flexible plastic material, ultrasonically welded together.

The lever 136 at its free end 136b carries an upwardly extending stationary pin 140 which is slidably received within a central opening 142 of the ratchet timer means 120. The ratchet timer means comprises an indexable ratchet wheel 145 having a plurality of peripherally or circumferentially, equally spaced teeth 146. The teeth have a forward flank 146a which extends generally radially of the ratchet wheel 145 and a linearly tapered rearward flank 146b. The ratchet teeth 146 of the ratchet wheel 145 are adapted to be disposed within the path of movement of the leg 91 of the pawl 88 when the ratchet timer 120 and lever means 122 are in their second position, as shown in FIG. 2. To this end, the leg 91 of the pawl 88 has an ear or tooth 150 extending transversely outwardly of a flexible finger 148 integral with the leg 91 which engages the sides 146a of the teeth to effect an indexing movement of the ratchet wheel 145 equal to the angular distance between two adjacent teeth each time the pawl is reciprocated toward the right in the direction of the arrow 101. The finger 148 is separated from the upper portion of the leg 91 by a slot 149.

The ratchet timer 120 and lever means 122 is adapted to be biased toward its second position, as shown in FIG. 2, wherein a transversely extending leg portion 151 of the lever 130 overlies the leg 91 of the pawl 88 to hold the same in its second position after the latter has been moved thereto and wherein the ratchet teeth 146 are disposed in the path of movement of the ear 150 of the leg 91 of the pawl 88 by the torsion spring 124. The torsion spring 124 has one end 124a thereof secured to the frame 41 and its other end 124b secured to the lever means 122. The torsion spring 124 is biased so as to tend to pivot the lever means 122 in the counterclockwise direction, as viewed in FIG. 2.

The ratchet timer 120 and lever means 122 are adapted to be moved from their second position, as shown in FIG. 2, toward their first position, as shown in FIG. 6, by cooperable cam means carried by the ratchet wheel 145 and the lever 130. To this end, the ratchet wheel 145 is provided with an upwardly or axially extending cam 160 having a bevelled forward surface and the lever 130 is provided with a downwardly and transversely extending leg portion 164 having a curved surface 168. When the ratchet timer and lever means 122 are in the position shown in FIG. 2 and the ratchet wheel 145 is being indexed through its next to the last indexing movement prior to completing one complete revolution, the cam 160 on the ratchet wheel will engage the cam 164 on the lever 130 to cause the lever 130 to be pivoted about the shaft 134 in a clockwise direction toward a position shown in FIG. 6. During this next to the last indexing movement, the lever 136 flexes and remains in the position shown in FIG. 2 due to the fact that the ratchet wheel 145 cannot be moved along with the lever 130 since it is camming the lever 130 in a clockwise direction about the pivot 134. Likewise, the ratchet wheel 145 cannot pivot in a counterclockwise direction with respect to the shaft 134 since it contains a downwardly extending tab 169 which engages the side of the frame defining a slot 170. As the lever 130 moves to its position shown in FIG. 6, the pawl 88 is released by the lever 130 and the spring 110 returns the pawl to its upper position, as shown by the solid lines in FIG. 4, and thereby interrupt the driving connection between the pawl 88 and the pump rod 47. The ratchet wheel 145, however, is indexed one additional indexing movement. To this end, the ratchet wheel has a high tooth 146c which is engaged by the pawl 88 while the latter is in its upper position. During this last indexing movement, the cam 160 on the ratchet wheel 145 clears the cam 164 on the lever 130 and the flexible lever 136 will flex and effect movement of the ratchet wheel 145 towards its position shown in FIG. 6. The tab 169 is allowed to move with the ratchet wheel 145 since it is disposed within the slot 170.

The ratchet timer 120 and lever means 122 when moved toward their first position, are adapted to be retained in the latter position by the solenoid operated retainer means 126. The retainer means 126 comprises a plastic, generally rectangularly shaped, box or frame 180 suitably secured to the frame 41. The frame 180 has upper, lower and side walls 181–184, respectively. The lower wall 182 supports a solenoid coil 186, the opposite ends of the solenoid coil 186 being secured to stationary electric terminals 187 and 188 respectively carried by the side walls 182 and 183 of the frame 180. Slidably received between the side walls 182 and 183 and slidably engaged with the underside of the top wall 181 is a tab or flange 190 integral with the lever 130 intermediate its ends and extending transversely thereof. The flange 190 is generally L-shaped, as viewed in FIG. 5, and it is adapted to be clamped against the underside of the upper wall 181 when in its first position, as shown in FIG. 6, by a spring biased armature 200.

The armature 200 has a first leg portion 201 which is generally planar and which is pivotally connected at its end 202 to the support frame 41. The armature also has a second leg portion 205 wich overlies the solenoid coil 186 and an intermediate bite or reversely bent portion 210 between the leg portions 201 and 205.

The armature 200 is adapted to be moved between a first position, as shown by the solid lines in FIG. 5, in which the bite portion 210 clamps the tab 190 against the underside of the upper wall 181 of the frame 180 and a second position, as shown by the dotted line in FIG. 5, in which the armature 200 releases the tab 190 so that the lever means 122 can be pivoted to its second position, as shown in FIG. 2 by the spring 124. The armature 200 is adapted to be biased towards its first position by a tension spring 220 having one end secured to the upper wall 181 of the frame 180 and its other end secured to the end 222 of the leg portion 205 of the armature 200. The frictional engagement between the tab 190 and the armature 200 and the upper wall 181 of the frame 180 as a result of the clamping force exerted by the spring 220 is greater than the biasing force of the spring 124 tending to move the lever means 122 toward its second position as shown in FIG. 2. Hence, when the lever means 122 has been moved to its first position, as shown in FIG. 6, and the solenoid 186 is de-energized, the lever means 122 will be retained in this position as a result of its being clamped between the bite portion 210 of the armature 200 and the underside of the wall 181 of the frame 180.

The armature 200 is adapted to be moved from its solid line position, as shown in FIG. 5, towards its dotted line position, as shown in FIG. 5, in response to momentary energization of the solenoid coil 186. When the coil 186 is energized, the second leg portion 205 of the armature 200 is drawn in the direction toward the coil, i.e., toward its solid line position shown in FIG. 5. This releases the tab 190 from its clamping engagement with the underside of the wall 181 of frame 180 and allows the spring means 124 to pivot the lever means 122 in a counterclockwise direction from its first position, as shown in FIG. 6, toward the second position, as shown in FIG. 2.

Operation of the washer unit 16 will be described with reference to the schematic electrical system or diagram shown in FIG. 7. The electrical control system includes a battery 230 having one terminal connected to a ground $G_1$ via a wire 231 and its other terminal connected via a wire 232 to an ignition switch 233. The control system further includes a first spring biased push button switch 235 which is normally spring biased to an open position, but is depressable to a closed position, a second spring biased push button switch 236 which is normally spring biased to an open position, but can be depressed to a closed position, the solenoid 93 and the solenoid 186.

It should be noted that the washer unit 16 can only be activated when the wiper unit 14 is energized, since the drive means 75 is driven by the wiper motor 25. It will, of course, be understood that a separate drive means for the washer pump assembly could be provided, if desired. When the wiper unit 14 is energized and the washer unit 16 is de-activated, the pawl 88 is constantly reciprocated while in its first or upper position in which the ear 105 thereof passes over or clears the tab 106 on the pump rod 47. Also, the plunger 45 is at the end of its discharge stroke, since the spring 72 biases it to this position when the pump rod 47 is disconnected from the pawl 88. Additionally, the ratchet timer 120 and lever means 122 are retained in their first or normal position by the retainer means 126, as shown in FIG. 6. It is retained within the retainer means 126 as a result of the flange 190 being clamped against the upper wall 181 of the armature 200.

When the operator desires to initiate a demand wash cycle, he will depress push button switch 235 to its closed position. When push button switch 235 is in its closed position, a circuit is completed from battery 230, wire 232, normally open but now closed ignition switch 233, wire 238, normally opened, but now closed push button switch 235, wire 240, solenoid coil 93, wire 242, to ground $G_2$ to energize the solenoid coil 93. Energization of the solenoid coil 93 causes the pawl 88 to be moved from its upper position, as shown in FIG. 4, to its lower position, as shown by the phantom lines in FIG. 4. Movement of the pawl 88 to its lower position, causes the ear 105 thereof to hook over the upturned tab 106 on the pump rod 47 and to effect movement of the plunger 45 through its intake stroke when the pawl 88 is reciprocated through its rearward stroke in the direction of the arrow 101. This drivingly connects the pawl 88 to the pump rod 47 of the plunger 45 to effect pumping operation of the pump 43, and in a manner hereinbefore described. The pawl 88 will remain in the lower position so long as the push button switch 235 is held in its closed position. Thus, the length of time the pump 43 operates to deliver washer fluid to the windshield is controlled by the operator of the vehicle. It should be noted that during the demand wash cycle, the ratchet timer 120 and lever means 122 are held in their first position, as shown in FIG. 6, by the retainer means 126 and thus they are not engaged by the pawl 88 as it is reciprocated.

When the operator desires a programmed wash cycle, he will momentarily depress push button switch 236 to its closed position. When the switch 236 is in its closed position, a circuit is completed from battery 230, wire 232, normally closed, but now open ignition switch 233, wire 238, normally opened, but now closed push button switch 236, wire 244, solenoid 186, solenoid 93, wire 242, to ground $G_2$. The completion of this circuit energizes both the solenoid 93 and the solenoid 186. Energization of the solenoid 93 causes the pawl 88 to be moved from its upper position, as shown by the solid lines in FIG. 4, to the phantom line position shown in FIG. 4, in which the ear 105 thereof will engage the tab 106 on the pump rod 47 to effect pumping operation. The simultaneous energization of solenoid 186 causes the armature 200 to be moved from its solid line position to its dotted line position, as shown in FIG. 5, in which it releases the clamping engagement against the tab 190 on the lever 130. When the tab 190 is released, the spring 124 will cause the lever means 122 to be biased in a counterclockwise direction toward the leg 91 until the tab 169 on the lever 136 engages the side of the frame defining the slot 170. When this occurs, the lever means 122 will be in a position shown in FIG. 2, and with the leg portion 151 overlying the pawl leg 91 to hold the pawl in its lower position in which it is drivingly connected with the pump rod 47. Thus, the release of the push button switch 236 after momentary energization, will now allow the spring 110 to return the pawl 88 towards its upper position, since it is held down by the leg portion 151 of the lever 130. Also, when the lever means 122 has been moved to the position shown in FIG. 2, the ratchet teeth 146 of the ratchet wheel 145 are disposed within the path of movement of the ear 150 on the leg 91 of the pawl 88 and thus, the ratchet wheel 145 is caused to be indexed during each rearward stroke of the pawl 88. On the next to the last indexing movement of the ratchet wheel 145 prior to the ratchet wheel being indexed one complete revolution, the cam 160 on the ratchet wheel 145 will engage the cam 164 on the lever 130 to cause the lever 130 to be pivoted about the shaft 134 in a clockwise direction. The ratchet wheel 145 which is rotatably carried by the flexible lever 136 cannot move with the leg 130, since it is being biased inwardly toward the leg 91 of the pawl 88 during the camming operation. Likewise, the ratchet wheel cannot be moved toward the leg 91 due to the engagement between the tab 169 on the ratchet wheel 145 and the frame 41. Also, during the movement of the lever 130 from its position shown in FIG. 2, towards its position shown in FIG. 6, the tab 190 is caused to be received and biasingly clamped between the armature and the upper wall 181 of the frame 180. The armature 200 is in its solid line position, as shown in FIG. 5, when the tab 190 is being received therein and the tab 190 is pushed between the armature 200 and the underside of the upper wall 181 of the frame 180 as a result of the camming action of the lever thereinto. Additionally, during this movement of the lever 130 towards its first position, as shown in FIG. 6, the lever 136 is flexed, since the ratchet wheel 145 cannot be moved at this time. When the lever 130 is moved to its FIG. 6 position, the pawl 88 is released and the spring 110 returns the pawl upwardly towards its upper position. This interrupts the driving connection between the pump rod 47 and the pawl 88 to stop pumping operation. The number of squirts of washer fluid delivered to the windshield during the programmed wash cycle is dependent upon the number of ratchet teeth provided on the ratchet wheel.

The ratchet wheel 145 is indexed one more indexing movement to complete one revolution and to disengage the cam 160 from the cam 164. This additional indexing movement is effected as a result of the provision of the high tooth 146c which allows the pawl to index the ratchet wheel 145 even though it is in its upper position. When the cam 160 on the ratchet wheel 145 clears the cam 164 on the lever 130, the lever 136 is freed and its self-biasing forces return it toward its normal position, as shown in FIG. 6. The return movement of the lever 136 moves the ratchet wheel 145 out of the path of movement of the pawl 88. This completes the programmed cycle of operation.

It should be noted that the ear 150 and finger 148 of the pawl 88 engage the rearward flank 146b of the ratchet teeth 146 during the forward stroke of the pawl 88 during the programmed cycle of operation and are deflected inwardly or away from the ratchet wheel 145 in opposition to the biasing forces of the finger 148 until it clears the flank 146b. When this occurs, the self-biasing forces of the resilient finger 148 returns the finger 148 toward its normal position in which it is located in the plane of the leg 91 and allows the ear 150 to hook behind the next adjacent tooth. During this movement of the pawl 88, the ear 105 slides on the tab 106, but remains drivingly engaged therewith. Reverse movement of the ratchet wheel 145 during the programmed wash cycle of operation is prevented by dogs (not shown) located internally of the ratchet wheel 145.

It should also be apparent that if only a demand washer mode of operation were desired, that the switch 236, lever means 122 and ratchet timer 120 and the retainer means 126 could be eliminated. Likewise, if only a programmed washer mode of operation were desired, that the switch 235 and retainer mean 126 could be eliminated. In the latter case, the leg portion 151 of the lever 130 would be spring biased into engagement with the leg 91 of the pawl 88 by the spring 124 when the washer unit 16 was not energized.

Although the illustrated embodiment hereof has been described in great detail, it should be apparent that certain modifications, changes, and adaptations may be made in the illustrated embodiment, and that it is intended to cover all such modifications, changes, and adaptations which come within the spirit of the present invention.

It is claimed:

1. A washer pump assembly for squirting washer fluid against different glass surface portions of an automotive vehicle comprising:

a support means;

a washer pump supported by said support means and having a plunger means which is reciprocable through intake and discharge strokes;

first spring means for effecting movement of said pumping members through one of its strokes;

a drive means having an interruptible driving connection with said plunger means and when drivingly connected therewith alternately effecting movement of the plunger means through its other stroke in opposition to the biasing force of said first spring means and permitting said spring means to move said plunger means through said one stroke;

said drive means including a drive pawl which is constantly reciprocated through first and second strokes when said drive means is energized and which is movable between a first position in which it is not drivingly connected with said plunger means and a second position in which it is drivingly connected with said plunger means to reciprocate the same, and a control mechanism which is selectively operable to provide either a demand wash cycle during which the pawl is drivingly connected with the plunger means so long as the operator desires or a programmed wash cycle during which the pawl is drivingly connected with the plunger means for a predetermined interval and then automatically disconnected therefrom, said control mechanism including a first selectively energizable means for moving the pawl from its first position towards its second position to effect the driving connection between the pawl and plunger, a second control means including a ratchet timer movable between a first position in which it is not indexed by said pawl when the latter is in its second position and a second position in which it holds the pawl in its second position and is indexed by said pawl, spring means for biasing said ratchet timer toward said second positions, retention means for normally holding said ratchet timer in its first position, and a manually manipulatable control means which can be selectively operated to effect energization of said first means to drivingly connect said pawl with the plunger means and to effect retention of said second means in its first position when a demand wash cycle of operation is desired and to effect energization of said first means to drivingly connect the pawl with the plunger and to allow said spring means to move said ratchet timer toward its second position when a programmed wash cycle of operation is desired.

2. A washer pump assembly for intermittently delivering squirts of washer fluid for a predetermined time interval to different glass surface areas of a windshield or an automotive vehicle comprising:

a support means;

a washer pump supported by said support means and having a plunger means which is reciprocable through intake and discharge strokes, first spring means for effecting movement of plunger means through its discharge stroke, a drive means having an interruptible driving connection with said plunger means and when drivingly connected with said plunger means alternately effective movement of the latter through its intake stroke in opposition to the biasing force of said first spring means and for permitting said first spring means to move said plunger means through its discharge stroke, said drive means including a drive pawl which is constantly reciprocated through first and second strokes when said drive means is energized and which is movable between a first position in which it is not drivingly connected with said plunger means and a second position in which it is drivingly connected with said plunger means, and a control mechanism which is selectively operable to provide either a demand wash cycle during which the pawl is drivingly connected with the plunger means so long as the operator desires or a programmed wash cycle during which the drive pawl is drivingly connected with the plunger means for a predetermined time interval and then automatically disconnected, said control mechanism including a first selectively energizable means for moving the pawl from its first position towards the second position to effect a driving connection between the pawl and the plunger means, second means including a lever means which is pivotally connected adjacent one end to said support means, a ratchet wheel timer rotatably supported by the lever means adjacent its other end, spring means for biasing said lever means and ratchet timer toward a first position in which it holds the pawl in its second position, after the latter has been moved thereto, and in which the ratchet wheel timer is indexed by said pawl when moved through its second stroke, selectively energizable retainer means for normally holding said lever means and ratchet timer in a second position in opposition to the biasing force of said spring means in which it does not hold the pawl in its second position and is not indexed by the pawl, and manually manipulatable control means which can be selectively operated for effecting energization of just said first means when a demand wash cycle of operation is desired and for effecting energization of both said first means and said selectively energizable retention means when a programmed wash cycle of operation is desired, said spring means moving said ratchet wheel and lever means towards its first position when said retainer means is momentarily energized and then de-energized to hold the pawl in its second position and to effect indexing movement of the ratchet wheel.

3. A washer pump assembly for intermittently delivering squirts of washer fluid for a predetermined time interval to a windshield of an automotive vehicle comprising:

a support means;

washer pump supported by said support means and having a plunger means which is reciprocable through intake and discharge strokes, first spring means for effecting movement of said plunger means through its discharge stroke, a drive means having an interruptible driving connection with said plunger means and when drivingly connected with said plunger means alternately effecting movement of the latter through its intake stroke in opposition to the biasing force of said spring means and for permitting said spring means to move said plunger means through its discharge stroke, said drive means including a drive pawl which is constantly reciprocated through first and second strokes when said drive means is energized and which is movable between a first position in which it is not drivingly connected with said plunger means and a second position in which it is drivingly connected with said plunger means, second spring means for biasing said pawl toward its first position, and a control mechanism which is selectively operable to provide either a demand wash cycle during which the pawl is drivingly connected with the plunger means so long as the operator desires, or a programmed wash cycle during which the drive pawl is drivingly connected with said plunger means for a predetermined time interval and then automatically disconnected, said control mechanism comprising first solenoid means for moving said pawl from its first position towards its second position to effect a driving connection between the pawl and the plunger means, a lever means including a substantially rigid lever and a second flexible lever pivotally supported by a shaft carried by the support means, a ratchet timer rotatably supported by said flexible lever, said lever means being movable between a first position in which said ratchet timer is not disposed within the path of movement of said drive pawl and a second position in which said ratchet timer is disposed within the path of movement of said drive pawl, spring means for normally biasing said lever means toward its second position, and retainer means including a frame, a spring biased armature for normally clamping said first lever against said frame to hold said lever means in its first position and a second solenoid operable to move the armature to release the clamping engagement between said first lever and said frame, and control means including a first switch which is selectively operable to energize only the first solenoid means for moving the pawl from its first position toward its second position to effect the demand cycle of operation for the washer unit, and a second momentary switch which is operable, when moved to a closed position, to energize both said first and second solenoid means to cause the pawl to be moved from its first position towards its second position to effect a driving connection between the pump rod and the pump plunger as well as allow the spring to move the lever means toward its second position in which the ratchet timer is disposed within the path of movement of the pawl and in which the first lever overlies the pawl to hold the pawl in its second position after said switch is moved toward its open position to effect de-energization of said first and second solenoid means, and cooperable cam means on said ratchet wheel and said first lever to effect movement of said lever from its second position toward its first position in which it is retained by the retainer means while the ratchet wheel remains stationary due to the flexing of the second lever until the cams clear each other to allow the self-biasing forces of the second lever to move the ratchet wheel to its second position during the last indexing movement of the ratchet wheel to complete one revolution thereof to end the programmed wash cycle, the pawl being released by said first lever when moved toward its first position to allow said second spring means to move said pawl towards its first position to interrupt the driving conection between the pawl and plunger means.

* * * * *

PO-1050
(5/69)

UNITED STATES PATENT OFFICE
CERTIFICATE OF CORRECTION

Patent No. 3,783,700          Dated January 8, 1974

Inventor(s) Lloyd L. Kuck

It is certified that error appears in the above-identified patent and that said Letters Patent are hereby corrected as shown below:

IN THE CLAIMS:
Column 13, line 20, delete "effective" insert -- effecting --.

Signed and sealed this 14th day of May 1974.

(SEAL)
Attest:

EDWARD M. FLETCHER, JR.
Attesting Officer

C. MARSHALL DANN
Commissioner of Patents